(12) United States Patent
Lustenberger (10) Patent No.: US 9,468,999 B2
(45) Date of Patent: Oct. 18, 2016

(54) METHOD AND APPARATUS FOR ADJUSTING A MACHINE

(75) Inventor: Martin Lustenberger, Villars sur Glane (CH)

(73) Assignee: DIGI SENS AG, Murten (CH)

(*) Notice: Subject to any disclaimer, the term of this patent is extended or adjusted under 35 U.S.C. 154(b) by 1334 days.

(21) Appl. No.: 13/256,797

(22) PCT Filed: Mar. 17, 2010

(86) PCT No.: PCT/CH2010/000073
§ 371 (c)(1),
(2), (4) Date: Oct. 24, 2011

(87) PCT Pub. No.: WO2010/105381
PCT Pub. Date: Sep. 23, 2010

(65) Prior Publication Data
US 2012/0035770 A1    Feb. 9, 2012

(30) Foreign Application Priority Data

Mar. 17, 2009  (CH) ........................................ 409/09

(51) Int. Cl.
*F16M 13/00*    (2006.01)
*F16M 1/00*     (2006.01)
*F16M 3/00*     (2006.01)
*F16M 5/00*     (2006.01)
(Continued)

(52) U.S. Cl.
CPC .............. *B23Q 1/0054* (2013.01); *F16M 7/00* (2013.01)

(58) Field of Classification Search
CPC ....... E04N 9/021; F16F 15/073; F16F 15/02; A01B 59/00; B60N 2/505; B60N 2/502; B60N 2/525; B60N 2/544; E02D 27/44; F16M 9/00; F16M 2200/00; F16M 2200/08
USPC ............. 700/1; 248/560, 566, 636, 637–638, 248/678–679
See application file for complete search history.

(56) References Cited

U.S. PATENT DOCUMENTS 4,141,527 A * 2/1979 Wolf ............................. 248/562
4,330,103 A * 5/1982 Thuries et al. ............... 248/548
(Continued)

FOREIGN PATENT DOCUMENTS

DE          2718543 A1    11/1977
DE         19650651 A1     6/1997
WO      WO-00/11395 A1     3/2000

OTHER PUBLICATIONS

Lasa Goni, Andoni, "International Search Report" for PCT/CH2010/000073 dated Jul. 12, 2010, 3 pages.

*Primary Examiner* — Ronald Hartman, Jr.
(74) *Attorney, Agent, or Firm* — Winstead PC (57) ABSTRACT

The invention relates to a load measuring element for the braces of a machine in order to determine the force transmitted by the load measuring element, comprising a carrier element which can be exposed to the force by way of a force introduction element and in turn rests on a support. The force introduction element, the carrier element, and the support interact with each other during operation such that the carrier element flexibly deforms under the weight load, wherein a measurement element is provided for determining said flexible deformation, In this way, an associated height adjustment can be specifically activated in order to adjust the machine such that it can be set up without impermissible distortion of the frame.

12 Claims, 4 Drawing Sheets

(51) Int. Cl.
  *F16M 7/00* (2006.01)
  *F16M 9/00* (2006.01)
  *F16M 11/00* (2006.01)
  *B23Q 1/00* (2006.01)

(56) References Cited

U.S. PATENT DOCUMENTS

| | | | |
|---|---|---|---|
| 4,930,741 A * | 6/1990 | Young et al. | 248/542 |
| 4,979,786 A * | 12/1990 | Kuraseko | 312/351.3 |
| 5,067,684 A * | 11/1991 | Garnjost | 248/550 |
| 5,242,147 A * | 9/1993 | Kemeny | 248/638 |
| 5,456,047 A * | 10/1995 | Dorka | 52/167.4 |
| 5,573,220 A * | 11/1996 | Whittaker et al. | 248/638 |
| 5,762,312 A * | 6/1998 | Whittaker | 248/633 |
| 6,116,565 A * | 9/2000 | Reinke et al. | 248/562 |
| 6,505,806 B1 * | 1/2003 | Glaesener | 248/638 |
| 6,729,597 B2 * | 5/2004 | Cholinski et al. | 248/646 |
| 6,739,568 B2 * | 5/2004 | Whittaker et al. | 248/638 |
| 7,757,441 B1 * | 7/2010 | Whittaker | 52/167.4 |
| 8,307,585 B2 * | 11/2012 | Mualla | 52/167.4 |
| 2005/0116134 A1 * | 6/2005 | Lee et al. | 248/650 |
| 2008/0251685 A1 * | 10/2008 | Tschinkel | 248/677 |
| 2012/0298832 A1 * | 11/2012 | Kobori | 248/635 |
| 2014/0090443 A1 * | 4/2014 | Schmauder et al. | 72/452.9 |

* cited by examiner

METHOD AND APPARATUS FOR ADJUSTING A MACHINE

The instant invention relates to a machine base according to claim 1, a machine according to claim 14, a method for adjusting a machine according to claim 12, a data processing system according to claim 13 and a computer program according to claim 14 and a computer program product according to claim 15.

Modern machines, in particular tool machines or processing centers, easily have dimensions of several meters and a weight, which can be up to 15 t or more. The workpieces are thereby processed in a highly accurate manner in the pm range, e.g. in electroerosion, but also by means of other methods. Depending on the type of processing, considerable forces can also act on the tool or on the workpiece, respectively; in addition, the workpieces, in turn, can reach a weight of several tons.

This places high demands in particular on the stiffness of the machine frame, which accommodates the processing forces and which defines the mutual position of the component assemblies, in particular of the guides of the machine. The machine frame is supported on the ground at least three-fold (that is, on a tripod). Depending on dimensions and mass of the machine, a larger number of supports, e.g. seven, nine or more than ten are also possible. As a rule, the supports are equipped with a height adjustment (which in turn is arranged on a machine base), which allows for the compensation of unevenness of the ground, so that the frame is supported to the prescribed extent and is thus protected against distortion, which, despite the high stiffness of the frame, impacts the processing accuracy up to the production of scrap.

With an increasing number of supports, it now becomes more difficult to adjust a machine, because, in the concrete case, the correct height of a support on uneven ground cannot be determined ahead of time but must be found as good as possible by continuously changed adjustments in response to the adjustment of the machine. Because the frame must be very stiff, an impermissible distortion, which impacts the required processing accuracy, can hardly be controlled optically, so that, as a result, the height adjustments must also be adjusted based on feelings with lengthy operations.

Even if aids, such a laser measuring means, are available, the adjustment work is problematic. Even though a deviation of the orientation of the frame, e.g. from the horizontal, or the respective correct orientation, respectively, can be determined, a lengthy process still remains until the correct orientation has been reached, because the correction of one of the height adjustments always has the effect that the other height adjustments must be readjusted. In addition, it is often unclear, which height adjustment must be corrected in which direction, not to mention the extent of the required correction.

Such problems can be avoided, for the most part, when the machine is placed onto an individually set-up foundation, which does not encompass any unevenness or defined anchoring points, respectively.

On the one hand, foundations which literally cement the machine location, are desired less and less due to the advancing flexibility of the production surfaces, while machines and workpieces at the same time become larger and heavier in response to advancing process accuracy. In addition, unevenness of the ground can form anew continuously, e.g. in response to a change in ground loading by means of a new arrangement of machines. Such new unevenness of the ground can hardly be avoided, in particular when the production surface is formed by means of the ground of a story, thus does not rest on the underlying ground.

Accordingly, it is the object of the instant invention to create an apparatus and a method for being able to adjust machines of the mentioned type in an improved manner.

This object is solved by means of a machine base according to claim 1, by means of a machine according to claim 10, as well as by means of a method according to claim 12, a data processing system according to claim 13, a computer program according to claim 14 and a computer program product according to claim 15.

Due to the fact that the measuring element determines the predetermined flexible deformation of the carrier element resulting from the force transferred by the carrier element, this force and thus the machine weight bearing down on the machine base is known. Due to the fact that the carrier element is a part of the height adjustment of the machine base, an additional resilient component is not added to the support of the machine, which would have negative effects on the frame, in particular on the dynamic behavior thereof. However, the height of the machine base can now easily be adjusted such that the intended weight bears thereon, wherein an objective control is possible with reference to this. The feeling or the known "golden touch" of the operator, respectively, is not necessary anymore. The correct adjustment no longer requires the experience and the feeling and/or the support by further indirect measuring methods. On principle, the desired weight is known from the constructive design of the frame and can be determined at any time by means of the method of the finite elements. In addition, the machine base according to the invention has the typical dimensions, thus is not higher. Effects on the frame or further disadvantages, respectively, thus do not occur.

Due to the fact that a flexible deformation of the carrier elements is measured as a component of the machine base (due to the fact that it is a component of the height adjustment thereof), the elastic deformation of an element is measured, the mechanical characteristics of which (stiffness, suspension characteristics) are permissible, i.e. without impermissible effects, in view of a respective frame.

A machine according to claim 10 comprising machine bases according to the invention, also corresponds to the invention, which allows for the further optimization of the frame, because the stiffness must not additionally be designed for an incorrect support.

The method according to claim 12 according to the invention, in turn, allows for a particularly short adjusting time, which inevitably leads to an objectively correct height adjustment of the machine bases without further aids.

A data processing system according to claim 13 not only allows for the quick adjustment of the machine, but also for the monitoring of the correct height up to a re-correction in the case of changing ambient conditions.

A computer program according to claim 14 or a computer program product according to claim 15, respectively, make it possible to adjust machines, which are equipped with machine bases according to the invention, without the necessity that the machines, in turn, must be equipped with a data processing system.

The invention is described in more detail by means of the following figures.

Figure 1A:
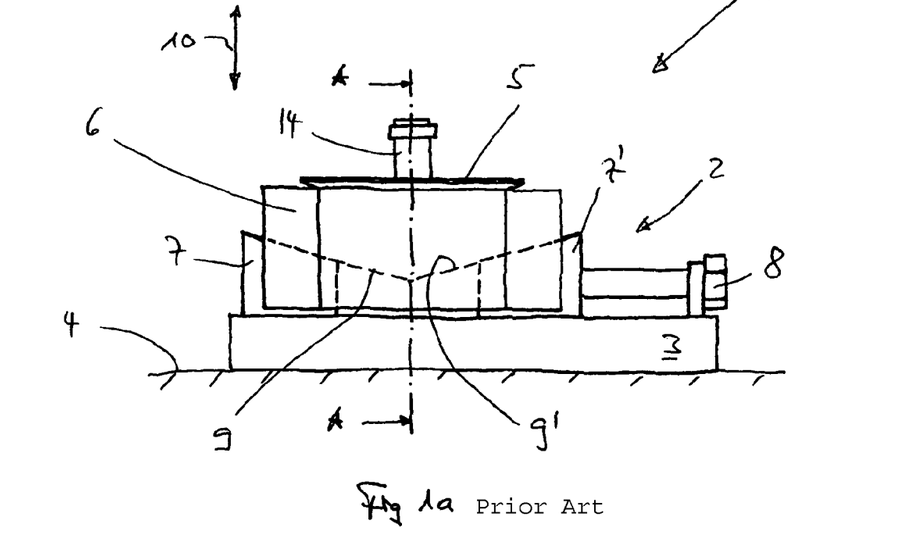
FIG. 1a shows a lateral view of a machine base comprising a height adjustment according to the state of the art.

FIG. 1a shows a lateral view of a machine base 1 according to the state of the art, which is known to the person of skill in the art, which encompasses a height adjustment 2 and which rests on a base plate 3, which in turn is located on the ground 4, e.g. of a production hall. A load baring plate 5, which is embodied as a force introduction element and on which a carrier element, which is embodied as an adjusting block 6, is supported, wherein said adjusting block 6, in turn, rests on a wedge arrangement 7, 7', which is embodied as a support, the double wedges 7 and 7' of which can be moved towards one another and away from one another by means of an actuating screw 8 is further illustrated. The contour of the double wedges 7 and 7' is indicated in a dashed manner, provided that they project into the adjusting block 6 and are thus covered by it. Likewise, inner gliding surfaces 9, 9' of the adjusting block 6 via which the adjusting block 6, is supported on the wedge arrangement 7, 7', are suggested in a dashed manner.

When actuating the actuating screw 8, the double wedges 7 or 7', respectively, move towards one another or away from one another, as mentioned, so that the adjusting block 6 is moved upwards or downwards in the direction of the double arrow 10. The actuating screw 8, the wedge arrangement 7, 7' and the gliding surfaces 9, 9' thus form the height adjustment 2 of the machine base 1.

Figure 1B:
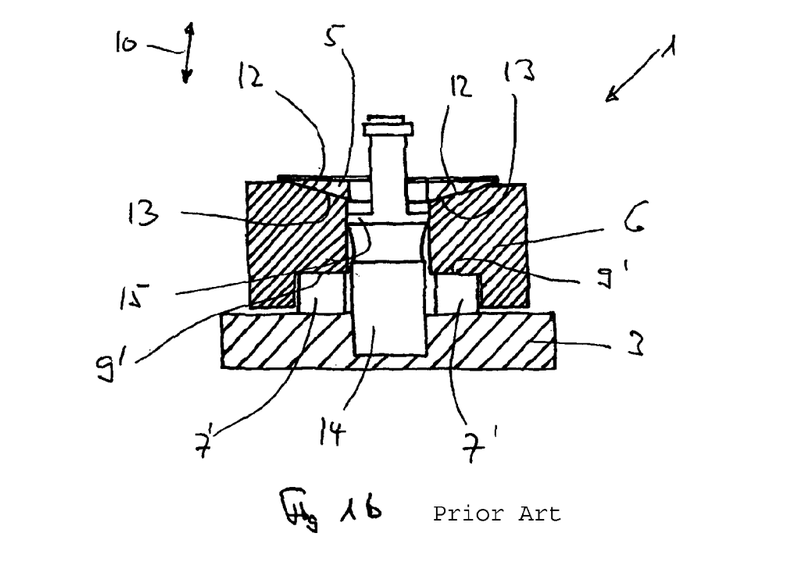
FIG. 1b shows a cross section along line AA of FIG. 1a, FIG. 2a shows a cross section along line AA of FIG. 1a, wherein the machine base of FIGS. 1a and 1b has been modified according to the invention.

FIG. 1b shows a section through the machine base 1 in the plane AA of FIG. 1a. The conical outer surface 12 of the load bearing plate 5 can be seen, which bears on a countersink 13, which is embodied so as to be substantially diametrically opposed, of the adjusting block 6 and which thus centers itself relative thereto.

The adjusting block 7, in turn, is centered on the base plate 3 by means of an anchoring bolt 14, which is preferably screwed to the base plate and which holds the adjusting block 6 in position via a shoulder 15, even if the height of said adjusting block is adjusted according to the double arrow 9.

According to the viewing direction, the double wedge 7', on which the adjusting block is bears via its inner gliding surfaces 9', can further be seen.

The arrangement shown in FIGS. 1a and 1b is advantageous in view of the smaller installation height. However, it does not allow for a sensitive adjustment of the height, because the resistance in the thread and between the wedge surfaces is considerable and because in particular the transition from the adhesion to the dynamic friction leads to a sudden rotation of the actuating screw and thus typically does not allow for a finely resolved rotation, with the effect that an intentional height correction often leads to an actually unknown height adjustment, which further complicates the correct adjusting process and sometimes makes it impossible.

Figure 2A:
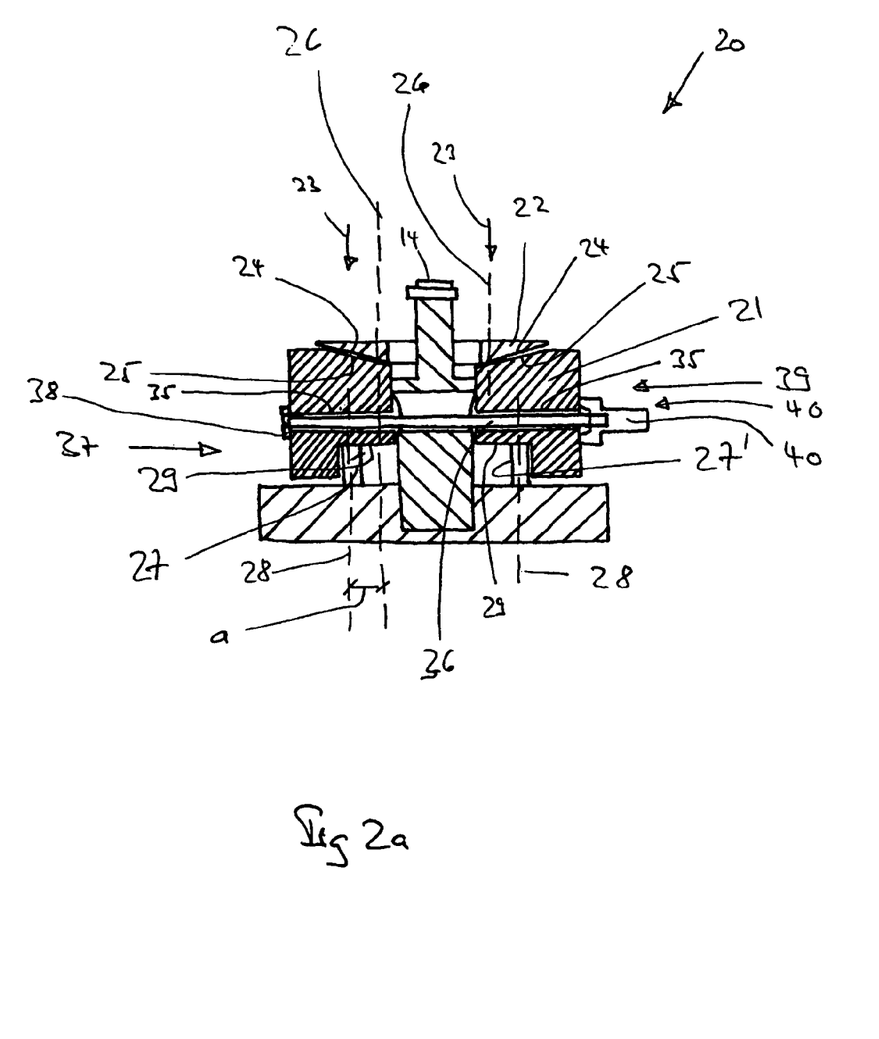

FIG. 2a shows a cross section of a preferred embodiment of a machine base 20 according to the invention, as it can be constructed by the modification of a machine base 1 (FIGS. 1a and 1b).

A carrier element 21, which is embodied so as to be massive and which is plate-shaped herein, is subjected to a force or to the weight of a machine, respectively, which is symbolized by means of the arrows 23, by means of a force introduction element 22. With its conical annular surface 24, the force introduction element 22 bears on the carrier element 21 via a likewise conical countersink 25 thereof; however, the inclines of the annular surface 24 and of the countersink 25 are different, that is, the annular surface and the countersink 25 are not embodied so as to be diametrically opposed. The incline of the annular surface is the larger one, with the effect that the annular surface 24 remains in contact with the countersink 25 only in the predetermined inner area, which is marked by means of the dashed line 26.

The carrier element 21, which is stiff due to its embodiment in the direction of the operating load, transfers the weight forces to a support, which is formed by means of the wedge brackets 27, 27'. The wedge brackets 27, 27' are embodied so as to be narrow and are offset outwardly in such a manner that they support the carrier element 21 only via the outer area of the gliding surfaces 29, which are marked by means of the dashed line 28.

As a result, the force introduction element 22 introduces the weight forces into the carrier element 21 centrally, and said force introduction element, in turn, introduces the weight forces into the support, which is formed by the wedge brackets 27, 27', offset against the outside. With this, the force introduction element 22, the carrier element 21 and the support formed herein by the wedge brackets 27 are embodied such that the weight force, which is introduced into the carrier element 21 via the force introduction element 22 on the one hand, and such that the weight force, which is introduced into the support via the force introduction element 22, on the other hand, run laterally offset to one another with reference to the effective direction thereof, in the arrangement of FIG. 2a at a distance a.

In the case of further embodiments in the concrete case, the person of skill in the art can also allow for the acting forces, e.g. the operating load acting on the carrier element, to act laterally instead of centrally, wherein the operating load, which is always introduced into the wedge arrangement in the case of these embodiments, then runs laterally offset relative to the operating load, which is introduced into the carrier element.

A borehole 35 permeates the carrier element 21 in a straight line and at right angles to the wedge brackets 27, 27'. A spacer element, which is embodied as a tension rod 36, is arranged in the borehole 35. Said spacer element is anchored to the carrier element 21 on the one side 37 thereof, e.g. by means of a screw nut 38, which is screwed thereon, and ends in a vibrating string sensor 40 on the other side 39 of the carrier element 21 and is arranged thereon in an operative manner. This arrangement forms a length measuring element 41, which can determine the distance between two measuring points on the carrier element 21: in the embodiment illustrated in the figure, the one measuring point is located on the side 39 of the carrier element, at the location of the screw nut 38, and the other measuring point is located on the other side 40 of the carrier element, at the location of the sensor 40.

Vibrating string sensors are known. They have a vibrating string, which is arranged in a magnetic field and which is excited by an alternating current, wherein the natural frequency thereof changes with the prestress. In the vibrating string sensor 40, a change of the distance of the two measuring points (that is, a change in length acting on the measuring element 41) is now converted into a changed prestress of the vibrating string via an elastic deformation of the fastener of the vibrating string and the natural frequency of the vibrating string, which is changed through this, is evaluated electronically in a manner, which is known to the person of skill in the art, so as to obtain the current length or the current distance between the measuring points, respectively.

Such measuring elements 41, which are used in the preferred embodiment shown herein, comprising vibrating string sensors have the advantage that they can reliably detect very small changes in length in the range of several µm.

Figure 2B:
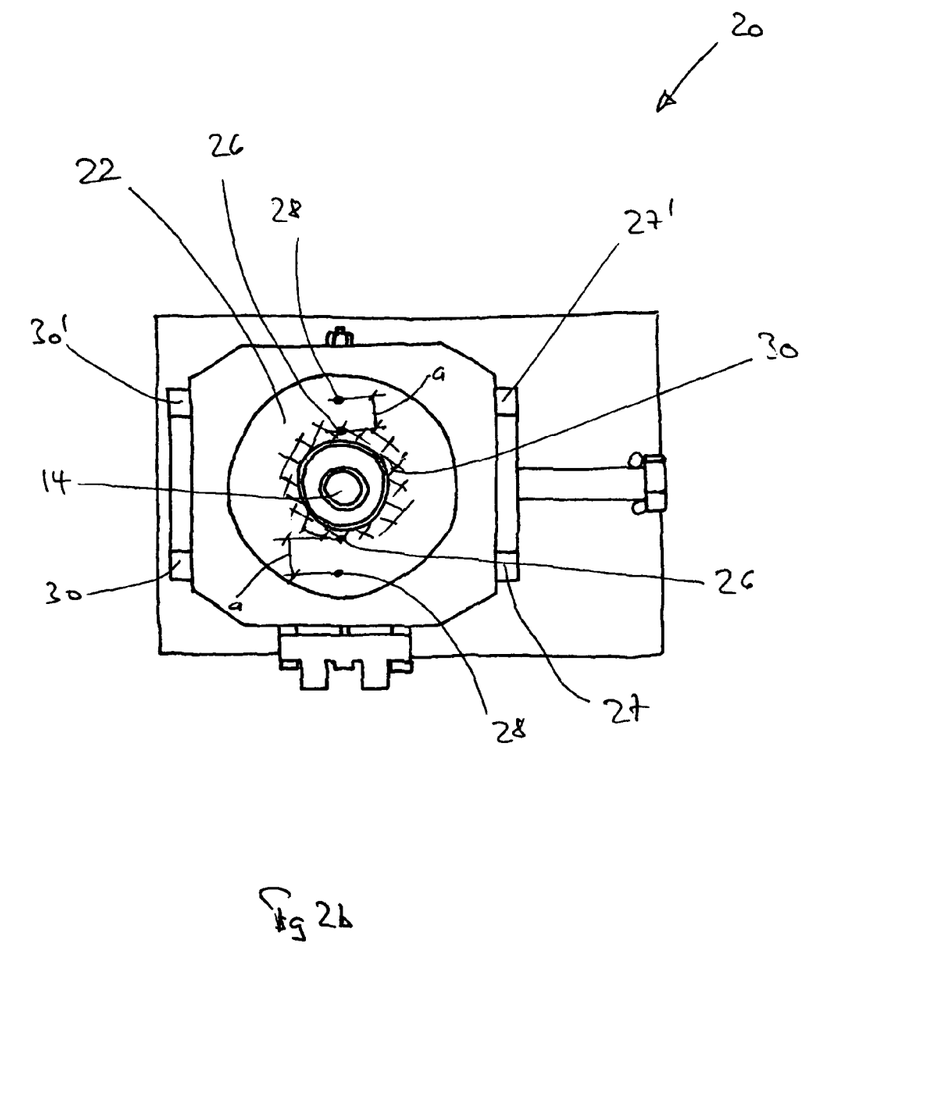
FIG. 2b shows a view from the top onto the machine base of FIG. 2a, FIG. 2c shows the cross section of FIG. 2a, wherein the machine base according to the invention is illustrated in the loaded state.

FIG. 2b shows the machine base 20 in a view from the top. The force introduction element 22, which bears on the carrier element 21 in the hatched area 30 (according to the dashed line 27 of FIG. 2a) in a view from the top. In addition, the wedge brackets 27, 27' and 30, 30', which form the support for the carrier element 21, are illustrated. Further shown is the distance a between the lines of action of the weight forces, which are introduced into the carrier element 21 via the force introduction element 22 on the one hand, and of the weight forces, which are transferred by the carrier element 21 into the support, which is formed by the wedge brackets 27, 27' and 30, 30', on the other hand.

Figure 2C:
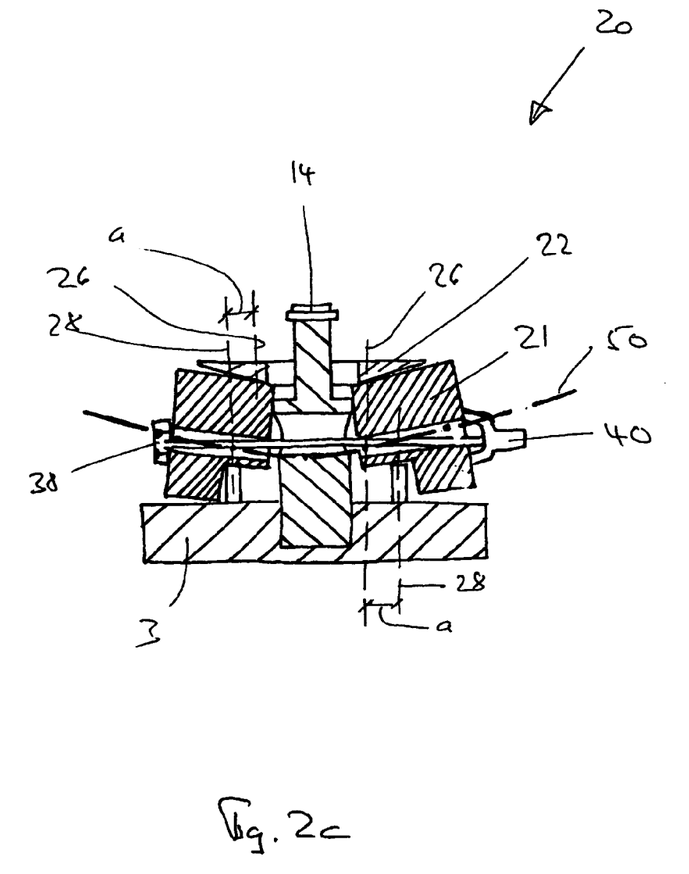

FIG. 2c shows the machine base 20 in the loaded state in a schematic view. Thanks to the forces, which act spaced apart at distance a to one another, the carrier element 21 is bent according to the bending line 50, which is drawn in by means of a dash-dotted line. In other words, the force introducing locations of the force introduction element 22 (hatched area 30 in FIG. 2b) and the support area for the support are arranged on the carrier element 21 (gliding surfaces 29 in FIG. 2a) in such a manner that the bending moments, which result under the load of the weight in the carrier element 21, are rectified in such a manner that a bending line comprising only one bending direction results in the carrier element 21.

The bowing has the result that the distance between the two measuring points located on the sides 37 and 39 of the carrier element (at the location of the screw nut 38 and of the sensor 40) changes. The changed distance is detected by means of the measuring device 41 and is converted by means of an evaluation electronic into a weight specification, which can be illustrated optically via a suitable output unit and/or which can be transmitted to a computer or a data processing system, respectively.

The embodiment illustrated in FIGS. 2a to 2c has the advantage that it has a carrier element, which is stiff in the direction of the operating load, that is, a very high spring constant: In response to being loaded with 5 t, in an embodiment embodied in such a manner, the force introduction element drops depending on the dimensioning thereof, e.g. only by 0.05, preferably by 0.01 and more preferably by 0.008 mm. The effects on the frame of a machine are thus safe. Compared to this, a deformation (dropping of the force introduction element) of from 0.5 mm per 5 t must be expected in the case of conventional load cells, which would make the use of such load cells impossible in the context of the below-described method.

In addition, the embodiment illustrated in FIGS. 2a to 2c has an unchanged installation height as compared to a typical machine base, which is important for the set-up of a machine of the afore-mentioned type.

In summary, the machine base according to the invention of a height adjustment 2 encompasses an adjusting element (embodied herein as wedge arrangement 7, 7') and further a massively embodied carrier element 21, which interacts therewith and which transfers the operating load and which is stiff in the direction of the operating load, wherein the adjusting element and the carrier element 21 are embodied in such a manner that the carrier element 21 deforms elastically in a predetermined manner under operating load, and in that provision is made for a measuring element 41, which detects the distance of measuring points, the distance of which changes during the predetermined deformation.

In the concrete case, the person of skill in the art will design the carrier element in such a manner that it allows for a high moment of inertia in view of the load (and thus a high spring constant) and, in view of a reliable and accurate measuring, allows for the arrangement of measuring points, the movement of which is defined and as large as possible in response to the flexible deformation.

Such machine bases are possible in the most versatile embodiments.

For example, the force introduction element can be embodied in such a manner that it is in contact with the carrier element via an elongate contact area, which extends centrally across the carrier element, and wherein the contact area preferably runs substantially parallel to the wedge surfaces of the wedge arrangement (or parallel to the shank of the actuating screw 8, respectively). Preferably, such a contact area has a width of 15 mm, more preferably a width of 10 mm. Such an arrangement has the advantage that the sensitivity is increased for the measuring and the hysteresis is reduced in response to different weight loads. It goes without saying that the force introduction element, which is embodied in such a manner, can likewise rest on chamfers in the carrier element (analogous to the conical countersink 25).

It furthermore lies within the field of the instant invention to embody the measuring element such that it winds around the carrier element on the outside and is elongated accordingly by means of the flexible deformation. In the concrete case, the person of skill in the art can also choose a suitable measuring element herein, provided that the dissolution capability thereof leads to the respectively desired dissolution of the weight measuring.

Finally, depending on the specific circumstances, the person of skill in the art can embody the carrier element and the adjusting device of the machine base in such a manner that the predetermined deformation, which results under operating load, does not lead a bending, but to a deformation, which is caused by a shear force (e.g., a cuboidal carrier element would be deformed into a rhomboid in the longitudinal section).

The flexibility in the constructive embodiment of the machine base according to the invention allows for the modification of numerous different embodiments of machine bases comprising the mentioned advantages, in particular of the operating travel located in the range of a thousandths of a millimeter and small installation height.

It further lies within the field of the instant invention to equip a machine with a computer or with a data processing system, respectively, which includes data relating to the deformation of the machine frame in view of the support thereof relative to the underlying ground, wherein a program is stored in the computer, which processes the current actual values of one or a plurality of the machine bases according to the invention during operation and which generates desired adjustments for the arrangements for the height adjustment, which are assigned to the one or the plurality of machine bases, according to the data relating to the deformation of the machine frame. On the one hand, the data relating to the deformation of the machine frame can comprise calculations directed to the respective frame or, on the other hand, a simplified model, which simulates the deformation of the machine frame in a suitable manner. The stored program then calculates the effect of faultily adjusted height adjustments, e.g., from the actual load of the assigned machine base on the frame, or the distortion caused by this, respectively, which, in turn, allows for the calculation of desired loads at the location of this machine base. The height adjustments can then be specifically adjusted one after the other until the respective desired load has been reached and the correct adjustment of all height adjustments is thus at hand. If necessary, this can be repeated for a high adjusting accuracy.

A non-computerized method for adjusting a machine is available in that a predetermined desired load is assigned to each of the machine bases according to the invention and the height adjustment of that machine base, the actual load of which has the largest deviation from the desired load is then corrected, and wherein the correction is made until another machine base encompasses the largest deviation from the desired load: the height adjustment of this other machine base is then corrected and so forth until the actual load of each machine base lies within a predetermined deviation from the desired load assigned to it.

According to the invention, a data processing system is further provided, comprising an execution environment for carrying out an application, which, based on desired values stored in a storage, processes input actual values of this weight load for the weight load acting via supports points of a machine, and generates desired adjustments for the arrangements for the height adjustment, which is assigned to the one or to the plurality of machine bases according to the invention, according to data relating to the deformation of a machine frame. This allows for the routine adjustment of machines having the same design via a portable computer, e.g.

Accordingly, a computer program comprising program code means is in accordance with the invention, so as to carry out all of the steps of the above-specified adjusting methods when the program is run on a computer. Likewise a computer program product comprising program code means, which are stored on a computer-readable data carrier for carrying out the above-mentioned steps when the program product is run on a computer.

The invention claimed is:

1. A machine base, comprising:
a height adjustment that encompasses an adjusting element;
a massively embodied carrier element that interacts therewith and transfers an operating load and which is stiff in a direction of the operating load;
wherein the adjusting element and the massively embodied carrier element are embodied in such a manner that the massively embodied carrier element deforms elastically in a predetermined manner under operating load and in that provision is made for a measuring element which detects a distance of measuring points, the distance of which changes during the predetermined deformation.

2. The machine base according to claim 1, wherein:
the adjusting element encompasses a wedge arrangement and the massively embodied carrier element interacts therewith via counter surfaces; and
the massively embodied carrier element and the wedge arrangement are embodied in such a manner that the operating load, which can be introduced into the wedge arrangement by means of the massively embodied carrier element, runs laterally offset relative to the operating load, which can be introduced into the massively embodied carrier element.

3. The machine base according to claim 2, wherein provision is made for a force introduction element that interacts with the massively embodied carrier element and via which the operating load can be introduced centrally into the massively embodied carrier element.

4. The machine base according to claim 3, wherein:
the force introduction element encompasses a conical annular surface for central introduction of weight forces into the massively embodied carrier element and, in turn, encompasses a conical countersink for contact with the force introduction element; and
inclines of the conical annular surface and the conical countersink are different in such a manner that they touch one another in response to an operable contact in a predetermined inner edge area.

5. The machine base according to claim 3, wherein:
the force introduction element is in contact with the massively embodied carrier element via an elongate contact area that extends centrally across the massively embodied carrier element; and
the elongate contact area runs preferably substantially parallel to wedge surfaces to the wedge arrangement.

6. The machine base according to claim 3, wherein the massively embodied carrier element and/or the wedge arrangement are permeated by an opening that connects measuring points located opposite one another to one another, and the measuring element encompasses a tension rod that is anchored to the measuring point, runs through the opening and interacts in an operable manner with a sensor that is arranged on the other measuring point.

7. The machine base according to claim 1, wherein the measuring element is embodied as length measuring element, which preferably encompasses a tension rod, which, in turn, is anchored on a measuring point and which interacts in an operative manner with a sensor which is arranged on the other measuring point.

8. The machine base according to claim 1, wherein the measuring element encompasses a vibrating string sensor comprising a vibrating string that experiences a change of its prestress due to a change in length, which acts on the measuring element.

9. The machine base according to claim 1 wherein:
at least one of the measuring points is arranged on an appendage of the massively embodied carrier element; and the appendage is arranged on said massively embodied carrier element in such a manner that a distance of the measuring points changes to an increased extent in response to a change of a predetermined bowing.

10. A machine comprising:
at least one machine base according to claim 1:
a computer;
a data storage that includes data relating to a deformation of a machine frame in view of a support thereof relative to an underlying ground;
wherein a program is stored in the computer that processes current actual values of said one or said plurality of machine bases during operation and generates desired adjustments for arrangements for a height adjustment assigned to the one or the plurality of machine bases according to the data relating to the deformation of the machine frame.

11. A method for adjusting the machine according to claim 10, comprising:

wherein a desired load that is present when the machine is set up is assigned to each machine base of the plurality of machine bases and a height adjustment of that machine base;

wherein an actual load of which has a largest deviation from the desired load is then corrected; and wherein a correction is made until another machine base encompasses the largest deviation from the desired load, the height adjustment of said another machine base is then corrected until the actual load of each machine base lies within a predetermined deviation from the desired load assigned to it.

12. A data processing system comprising:

an execution environment for carrying out an application, which, based on desired values stored in a storage, processes input actual values of this weight load, which act via support points of a machine, and which generates desired adjustments for the arrangements for the height adjustment, which is assigned to the one or a plurality of machine bases according to claim 1, according to data relating to the deformation of a machine frame.

* * * * *